United States Patent [19]
Mandell et al.

[11] Patent Number: 5,390,256
[45] Date of Patent: Feb. 14, 1995

[54] DYNAMIC LOADER

[75] Inventors: Douglas E. Mandell, San Francisco; Martin J. Richards, Redwood city; Mark L. Atherton, San Bruno; Paul R. Goldberg, Palo Alto; Mark F. Davis, Pacifica, all of Calif.

[73] Assignee: Dolby Laboratories Licensing Corporation, San Francisco, Calif.

[21] Appl. No.: 891,590

[22] Filed: Jun. 1, 1992

Related U.S. Application Data

[63] Continuation-in-part of Ser. No. 804,976, Dec. 11, 1991, abandoned, which is a continuation-in-part of Ser. No. 638,896, Jan. 8, 1991, abandoned.

[51] Int. Cl.⁶ ............................................. H04B 3/00
[52] U.S. Cl. .................................... 381/77; 455/70
[58] Field of Search ............... 379/76; 455/70, 4.2, 455/2, 3.2, 6.3; 381/2, 77, 124; 358/343, 86; 375/8; 360/19.1, 27; 369/47, 48, 50; 348/484

[56] References Cited

U.S. PATENT DOCUMENTS

| | | | |
|---|---|---|---|
| 4,517,410 | 5/1985 | Williams et al. | 379/76 |
| 4,594,591 | 6/1986 | Burke | 455/70 |
| 4,654,881 | 3/1987 | Dolikian et al. | 455/70 |
| 4,658,296 | 4/1987 | Beech | 455/70 |
| 4,686,707 | 8/1987 | Iwasaki et al. | 455/70 |
| 4,787,085 | 11/1988 | Suto et al. | 381/2 |
| 4,788,543 | 11/1988 | Rubin | 455/58.1 |
| 4,792,974 | 12/1988 | Chace | 358/343 |
| 4,839,628 | 6/1989 | Davis et al. | |
| 4,841,561 | 6/1989 | Hill | 375/8 |
| 4,910,510 | 3/1990 | Davis et al. | |
| 5,067,119 | 11/1991 | Yoshida et al. | 360/27 |
| 5,077,830 | 12/1991 | Mallia | 455/70 |
| 5,133,081 | 7/1992 | Mayo | 381/2 |
| 5,161,251 | 11/1992 | Mankovitz | 381/2 |
| 5,182,553 | 1/1993 | Kung | 455/70 |
| 5,257,253 | 10/1993 | Otsubo et al. | 369/48 |

FOREIGN PATENT DOCUMENTS

| | | |
|---|---|---|
| 0130391 | 1/1985 | European Pat. Off. . |
| 238988 | 9/1987 | European Pat. Off. ........ 381/2 |
| 0402973 | 12/1990 | European Pat. Off. . |
| 3734084 | 4/1990 | Germany . |
| WO9113497 | 9/1991 | WIPO . |
| WO9115851 | 10/1991 | WIPO . |
| WO9116709 | 10/1991 | WIPO . |

*Primary Examiner*—Forester W. Isen
*Attorney, Agent, or Firm*—Thomas A. Gallagher; David N. Lathrop

[57] ABSTRACT

The invention relates generally to an apparatus and a method for receiving and processing information, and for adapting the operational characteristics of the processing in response to material included in the received information. More particularly, the invention relates to an apparatus and a method embodying a software-controlled process which adapts or modifies the software in response to the received information. Although the invention has many applications, the invention is more particularly described in connection with a motion picture application in which film stock carries a conventional analog SVA soundtrack and a digital soundtrack with a digital representation of the software required to properly process the digital soundtrack. An apparatus and a method according to one embodiment establishes what version of software is required to properly process the digital soundtrack, optionally modifies its software from information carried with the digital soundtrack if the current version on hand is not appropriate, and uses the updated version of software to process the digital soundtrack on the remainder of the current film and other future films until such time as another software update is required.

78 Claims, 2 Drawing Sheets

FIG. 3

DYNAMIC LOADER

CROSS-REFERENCE TO RELATED APPLICATION

This application is a continuation-in-part of copending International Application Number PCT/U.S. 92/00133 filed Jan. 8, 1992, which designated the United States for filing a continuation-in-part of U.S. application Ser. No. 07/804,976, filed Dec. 11, 1991, abandoned, which was a continuation-in-part of U.S. application Ser. No. 07/638,896, filed Jan. 8, 1991, abandoned.

BACKGROUND OF THE INVENTION

As software-controlled devices become increasingly important in many diverse fields of application, the difficulties associated with modifying the software that controls these devices is becoming increasingly troublesome. The need to modify software arises from a variety of situations such as: (1) the software does not operate correctly due to some deficiency in design or implementation, often referred to as a "bug"; (2) the needs of the application in which the software operates have changed, therefore the software must be modified, enhanced, or replaced in order to service the changed needs; or (3) new software is available which provides new features or which services an application more efficiently.

Modifications to software are placed into effect by a procedure referred to herein as an "installation." A particular embodiment of software is referred to herein as a "version" of the software. Thus, modifying or replacing a particular embodiment of software with a different embodiment is referred to as installing a different version of the software.

A later version of software which comprises corrections to bugs or a version which includes additional features is referred to herein as an "upgrade" and the installation of such a version is referred to as "upgrading" the software. Likewise, a former version of software or a version which comprises fewer features is referred to as a "downgrade" and the installation of such a version is referred to as "downgrading" the software.

It should be understood that, as used herein, the term "software" refers to all computer programs regardless of their embodiment. A distinction is sometimes made in the art between "software" which may be loaded directly into computer read/write memory and "firmware" which is embodied in Read Only Memory (ROM). No such distinction is made herein; the term "software" includes both types of computer programs. When necessary, firmware will be distinguished by terms such as "ROM-based software."

With the advent of microprocessor-based personal computers, installing new versions of software is a commonplace experience. This experience illustrates two principal difficulties associated with modifying software: performing the installation itself, and distributing the materials necessary to perform the installation.

Performing software installations is frequently troublesome because it often requires skills not normally possessed by the "end user" of the software product, or it demands time and/or expense which the end user does not wish to expend. The end user is sometimes required to provide critical information such as what type of equipment the installed software is to support, and to elect various options which customize the software's operation according to the end user's preferences.

By improving the sophistication of installation procedures, software developers have reduced the amount of end-user intervention required but some intervention is still generally required to decide at least whether the installation is to take place. End-user intervention is undesirable because it is inconvenient to the end user and because it also introduces an opportunity for mistakes which may invalidate the installation.

Distributing installation materials is difficult because of a host of administrative and logistical problems. The provider of the installation materials must know, for example, who needs the materials, what materials are needed, where and when the materials are needed, and the skill and training levels of the person expected to perform the installation. The responsibility to insure the provider has this knowledge can be placed upon the end user by requiring the end user to request the desired materials, upon the provider of the materials, or it can be shared.

It may be reasonable, for example, to expect an end user to request installation materials for a later version of word processing software which he or she wishes to install only because it has desirable new features.

It is not as reasonable, however, to expect an end user to assume responsibility for requesting installation materials to upgrade ROM-based software in a microprocessor-controlled Compact Disk (CD) player. The average end user probably will not even realize that the CD player is controlled by software. Responsibility must, therefore, fall upon the provider of the installation materials, but unless the provider has accurate records showing who uses which products, distribution of installation materials is difficult at best. Of course, even if the materials can be distributed, the installation itself may be essentially impossible for the end user to perform.

These two difficulties are readily apparent during development of a product such as the CD player mentioned above. During early product development, software is particularly volatile and requires frequent modification. Installation of a new software version entails either replacing the current ROM integrated circuits or "chips" with new ROM chips embodying the new version, or altering the contents of the current ROM chips if the chips are "programmable."

During later development phases, products are commonly subjected to "Beta testing" at locations geographically removed from product developers. The need to modify software continues, but such modifications become more difficult; replacing or reprogramming ROM chips is not normally within the capabilities of the average end user. The end user is normally dependent upon the product developer to install different versions of ROM-based software. The end user is usually required to take the product out of service and deliver it to the manufacturer or an authorized agent who installs new software. This procedure is costly and inconvenient, and perhaps even impossible if the end user cannot afford to take the product out of service.

Because of the difficulties involved with the distribution of installation materials and with the performing of the installation itself, the manufacturer of a CD player, for example, cannot reasonably require an end user to use conventional methods to install different software versions to play particular Compact Disks or particular selections on a Compact Disk. But the ability to install a different software version for each disk or selection offers some attractive advantages.

First, the operating characteristics of the CD player can be altered to accommodate, for example, changes in Compact Disk recording formats. Assuming that format changes are compatible with physical components or "hardware," a CD player can be manufactured now which will be able to play back disks encoded according to some future format not yet defined provided a suitable version of software not yet developed is installed in the CD player.

Similarly, a future playback system can be adapted to play back a disk with an older format provided a suitable version of software is installed. This illustrates an important concept: installations may downgrade as well as upgrade software.

Second, performance of a CD player can be optimized for each disk or selection. The producer of a Compact Disk can incorporate features or special effects not normally needed but which can enhance the playback of the particular disk or selection.

These advantages apply to a wide range of software-controlled "presentation system" products such as cinema soundtrack playback systems, audio-tape and audio-cassette-tape recorders, video-tape and video-cassette-tape recorders, and radio and television receivers. In general, a "presentation system" product receives one or more input signals comprising "presentation material" and processes that material to generate output signals which, in combination with suitable transducers, produce one or more perceptual stimuli such as sounds, visual images, odors, flavors, or touch.

The realization of the advantages discussed above depends upon the ability to provide for automatic installation of software without end user intervention and for automatic distribution of materials required for such an installation.

SUMMARY OF THE INVENTION

It is an object of the present invention to provide an apparatus and a method for the automatic installation of software versions without requiring end user intervention.

It is another object of the present invention to provide an apparatus and a method for the automatic distribution of installation materials to a software installation process.

According to the teachings of the present invention, an apparatus receives information comprising presentation material and operation material. In response to the presentation material, the apparatus generates one or more signals which represent one or more perceptual stimuli such as aural or visual stimuli. In response to the operation material, the system adapts the operational characteristics of the process which generates these signals.

In one embodiment of the present invention for a cinema soundtrack playback system, an apparatus receives from motion picture film stock both soundtrack information and processing software information; the processing software information conveys the version of software required to properly process the soundtrack information. According to this embodiment, the apparatus determines whether the version of software currently embodied in programmable ROM is suitable for processing the film soundtrack, and if not, constructs an appropriate version of software from the processing software information on the film and installs the constructed version in the programmable ROM. After the appropriate version of software is installed, the apparatus operates according to the newly installed software to receive and play back the soundtrack information.

According to further teachings of the present invention, a medium carries encoded information comprising two or more forms of presentation material corresponding to a set of signals representing perceptual stimuli such as aural or visual stimuli and comprising operation material corresponding to operational characteristics of an apparatus for generating perceptual stimuli in response to the presentation material.

In one embodiment of the present invention for a cinema soundtrack recording system, motion picture film stock carries soundtrack information in two forms, a conventional analog SVA soundtrack and a digitally encoded form of the soundtrack, and processing software information; the processing software information conveys the version of software required by a playback system to properly process the digitally encoded soundtrack.

Embodiments as well as objects and advantages of the present invention in addition to those discussed above are set forth throughout this description and particularly below in the Detailed Description of the Invention.

DETAILED DESCRIPTION OF THE INVENTION

Figure 1:
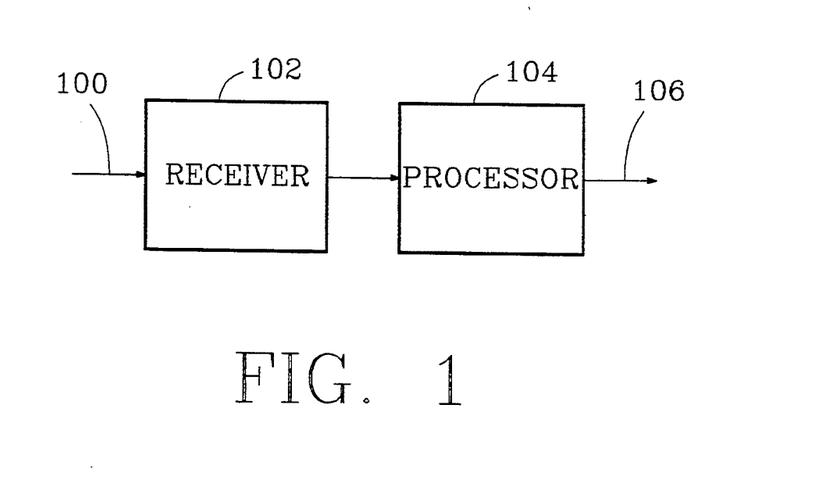
FIG. 1 is a functional block diagram of a presentation system which does not incorporate the present invention.

FIG. 1 illustrates the basic functional structure of a conventional presentation system. Receiver 102 receives from path 100 encoded information, extracts presentation material from the encoded information, and passes the extracted presentation material to processor 104. Processor 104 generates in response to the presentation material one or more signals representing one or more perceptual stimuli and passes these signals along path 106.

In one embodiment of a known CD playback system, for example, receiver 102 receives video-like signals from path 100 which represent visual images on a Compact Disk scanned by a laser-illuminator/photodiode-sensor combination; receiver 102 generates in response to the video-like signals Pulse Code Modulation (PCM) encoded digital information corresponding to the optical patterns carried by the Compact Disk; processor 104 converts the PCM encoded digital information into one or more analog signals which may be amplified and presented by suitable transducers such loudspeakers.

Figure 2:
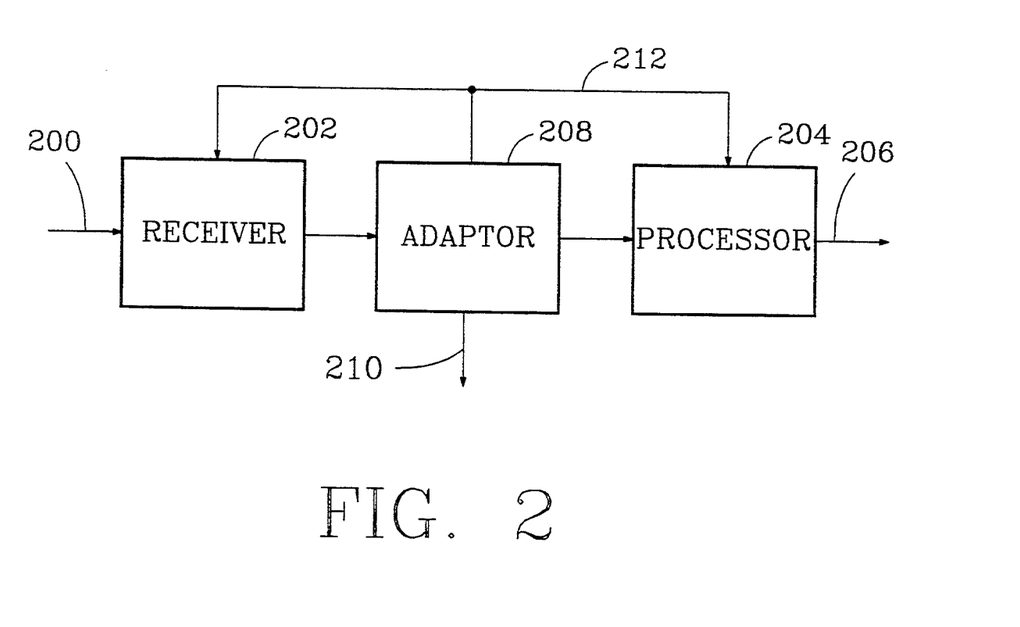
FIG. 2 is a functional block diagram of a presentation system which does incorporate the present invention.

FIG. 2 illustrates a basic functional structure of a presentation system according to the present invention. Receiver 202 receives from path 200 encoded information, extracts presentation material and operation material from the encoded information, and passes the extracted presentation and operation material to adaptor 208. By utilizing path 212 as required, adaptor 208 adapts the operating characteristics of receiver 202, processor 204, and/or adaptor 208 in response to the operation material, and passes the presentation material to processor 204. Processor 204 generates in response to the presentation material one or more signals representing one or more perceptual stimuli and passes these signals along path 206.

In a preferred embodiment of a primary presentation system, adaptor 208 interrupts the flow of presentation material to processor 204 and passes along path 210 instructions to one or more peripheral devices such as a secondary presentation system to provide temporary service while adaptor 208 is adapting the operational characteristics of the primary presentation system.

Many variations in embodiment come within the scope of the present invention: the nature of the information received from path 200, the components which constitute receiver 202 and processor 204, and the nature of the signals passed along path 206 are not critical to the practice of the present invention. For example, receiver 202 for a CD player may comprise both the optics and electronics required to obtain a PCM representation of the optical patterns carded by a disk, in which case the information received from path 200 comprise light waves. An alternative embodiment is like that described above; receiver 202 may comprise only the electronics in which case, for example, the information received from path 200 are video-like signals generated by a laser-illuminator/photodiode-sensor combination.

The allocation of certain processes among receiver 202, adaptor 208, and processor 204 may have important practical significance to the implementation of a presentation system, but the specific allocation chosen is not critical to the practice of the present invention. For example, receiver 202 may apply error detection/correction (EDC) techniques to the digital information recovered from a disk, or adaptor 208 and/or processor 204 may apply such techniques.

In an alternative embodiment, adaptor 208 may follow processor 204; however, the structure illustrated in FIG. 2 is the preferred embodiment for many applications. According to this preferred embodiment, adaptor 208 is placed as early as possible in the processing path so as to minimize the delay in adapting the operational characteristics in response to the operation material.

Figure 3:
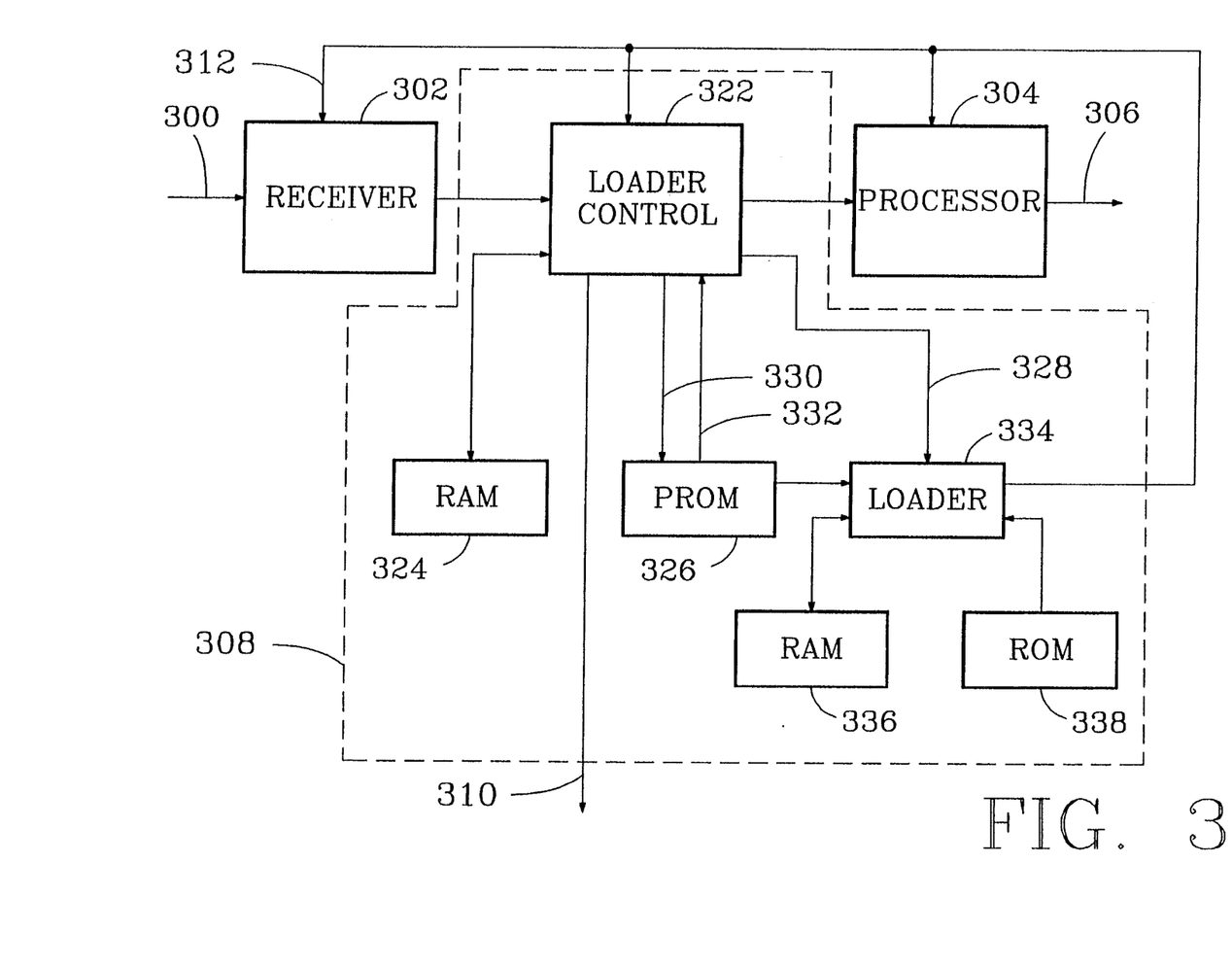
FIG. 3 is a functional block diagram of a cinema soundtrack playback system incorporating a preferred embodiment of the present invention.

FIG. 3 illustrates a basic functional structure of a cinema soundtrack playback system according to the present invention. Receiver 302 receives from path 300 encoded information, extracts presentation material comprising motion picture soundtrack information and operation material comprising processing software information from the encoded information, and passes the extracted soundtrack and processing software information to loader control 322 within adaptor 308. Loader control 322 passes the soundtrack information to processor 304 and optionally calls for the adaption of the operational characteristics of receiver 302, processor 304, and/or loader control 322 in response to the processing software information. Processor 304 generates in response to the soundtrack information one or more signals representing one or more channels of aural stimuli and passes these signals along path 306.

According to one embodiment, the software required to operate the cinema soundtrack playback system comprises several software modules. Each module corresponds to the computer program of one major "function" such as receiver 302, processor 304, or loader control 322.

During initialization of the playback system, loader 334 loads the appropriate software module into each of the major system functions. Loader 334 first examines the contents of Programmable Read Only Memory (PROM) 326. If PROM 326 contains a version of one or more software modules, loader 334 loads those modules into the system functions along path 312. Otherwise, loader 334 loads software modules found in ROM 338.

ROM 338 stores a base version of all software modules required to operate the playback system including the software required to control the operation of loader 334. The base version must be available to downgrade software modules in order to play back soundtracks on films which do not include operation material such as processing software information, and the base version also provides the software necessary to recover from catastrophic failures in PROM 326.

Also during initialization, loader 334 constructs in RAM 336 a "local directory" with entries for each software module indicating the version currently loaded into the system. A list of all software modules and their base version is copied from ROM 338 into RAM 336. Versions of software modules residing in PROM 326 are merged into the directory in RAM 336. Loader 334 also stores into RAM 336 the amount of unused or "free" space available in PROM 326. The local directory and the amount of free space is passed along path 312 to loader control 322.

After initialization is completed, the playback system begins normal operation according to the software loaded into the various functions. Receiver 302 extracts and formats "packets" of information in response to the encoded information received from path 300. An "audio packet" contains soundtrack information. A "software packet" contains processing software information. A "directory packet" contains a directory or an inventory of all software modules carded by the motion picture film, thereby indicating what versions of each software module is required to properly play back the film soundtrack.

Loader control 322 examines the contents of the directory packet and compares it to the local directory to establish whether each software module currently loaded in the system is adequate to properly play back the film soundtrack. If all modules are adequate, audio packets are passed to processor 304 for subsequent processing.

If the directory packet indicates that any of the currently loaded software modules are not adequate, then loader control 322 causes the inadequate modules to be altered by extracting information from certain software packets to construct in RAM 324 the appropriate version of those software modules corresponding to the inadequate modules.

In the preferred embodiment, loader control 322 begins extracting information from "relevant" software packets even before the directory packet is examined. "Relevant" modules are those which are appropriate for the particular hardware implementing the playback system; it should be appreciated that the software packets may convey processing software information appropriate for different playback system implementations. In this manner, loader control 322 can reduce the amount of time required to adapt the operational characteristics of the system by having relevant software modules already constructed, or in the process of being constructed, when the directory packet is examined just in case the directory packet indicates any software modules must be altered. If the directory packet indicates that no software modules need to be updated, loader control 322 stops extracting information from the relevant software packets.

After all of the required new versions have been constructed in RAM 324, loader control 322 checks the amount of free space available in PROM 326. If sufficient free space is available to hold all of the newly constructed modules, then loader control 322 begins loading them along path 330 into the unused areas of PROM 326 and decrements the amount of free space accordingly.

If there is insufficient free space in PROM 326 to hold the newly constructed modules, then loader control 322 obtains along path 332 a copy of those software modules in PROM 326 which do not have a corresponding new version constructed in RAM 324. Thus, loader control 322 places in RAM 324 the appropriate version of all software modules represented in PROM 326 which are required to play back the film soundtrack. After this is accomplished, loader control 322 erases the contents of PROM 326 and then loads along path 330 all modules in RAM 324 into PROM 326.

After loader control 322 completes loading the appropriate versions of software modules into PROM 326, it requests along path 328 that loader 334 reinitialize the system as described above. In this manner, loader control 322 and loader 334 are able to alter the operational characteristics of the playback system by loading appropriate versions of software into each of the major functions along path 312.

The preferred embodiment of the present invention also provides for installing a temporary version of one or more software modules without altering the contents of PROM 326. A "temporary" software packet contains software information which loader control 322 uses to construct a temporary software module in RAM 324 similarly to that described above for normal software packets; however, loader control 322 does not consult the local directory to establish whether a temporary software module should be loaded. Temporary software modules are always loaded into the system.

The loading of temporary software modules is accomplished as follows. After loader control 322 has constructed all of the temporary modules in RAM 324, it requests along path 328 that loader 334 load a special version of the loader control module residing in ROM 338. Operating under this special software version, loader control 322 sends along path 328 to loader 334 the temporary software modules residing in RAM 324. Loader 334 loads the major functions using these temporary modules rather than the corresponding modules in PROM 326 and ROM 338. After initialization is completed, the system begins operation according to the software loaded into the various functions. This feature is particularly useful for testing and for playing back one-of-kind film soundtracks.

In preferred embodiments, Flash Electrically Programmable Read Only Memory implements PROM 326; however, it should be appreciated that other implementations are possible such as Electrically Erasable Programmable Read Only Memory.

In the preferred embodiment of a cinema soundtrack playback system, the motion picture film carries a conventional analog soundtrack in the Stereo Variable Area (SVA) and digitally encoded information comprising software packets and audio packets with digital soundtrack corresponding to the SVA soundtrack. The primary playback system processes the digital soundtrack. If loader control 322 establishes that one or more software modules must be replaced by modules represented by information carried in the software packets, loader control 322 interrupts the flow of audio packets to processor 304 and indicates along path 310 that the primary playback system is interrupting operation. Playback of the film soundtrack may continue uninterrupted by switching to a conventional secondary playback system, not shown, which processes the SVA soundtrack. After new versions of software modules have been loaded and the primary system has resumed operation, loader control 322 indicates along path 310 that playback may switch to the primary system.

Additional details outside the scope of the present invention which pertain to the implementation of the preferred embodiment of a cinema soundtrack playback system are set forth in International Patent Application Number PCT/U.S. 92/00898 filed Feb. 4, 1992, designating the United States, which resulted in United States national application Ser. No. 07/937,887, filed Sep. 30, 1992, and in International Patent Application Number PCT/U.S. 92/00133 filed Jan. 8, 1992, designating the United States, which resulted in United States national application Ser. No. 07/927,429, filed Sep. 4, 1992, both of which are hereby incorporated by reference in their entirety. A preferred configuration of blocks containing digital sound track information interleaved with "ancillary blocks" containing ancillary information such as processing software information is set forth particularly on pages 32–33 of application number PCT/U.S. 92/00133; however, the actual configuration of blocks is not critical to the practice of the present invention.

The operation of devices peripheral to the cinema soundtrack playback system may also be adapted in response to operation material. A few examples include altering the acoustic characteristics of a motion picture theater by switching between different loudspeaker systems, altering the equalization characteristics of loudspeaker systems, and moving acoustic panels.

It should be appreciated that the present invention may be used in numerous applications. It is particularly useful in applications utilizing software-controlled products to process information carded by either a storage medium such as optical or magnetic storage media or by a transmission medium such as radio or television broadcasts.

For example, a television receiver may support both current signal standards such as NTSC and an advanced signal standard not yet defined by adapting its operational characteristics in response to operation material carried by the television signal. By defining the advanced signal standard to also include a basic signal standard such as NTSC, such a television receiver may present visual and aural stimuli according to the advanced standard provided it has adequate software, but can switch to the basic signal standard to provide continued operation while installing software required for the advanced signal standard received from the transmission itself.

We claim:

1. Apparatus comprising
receiver means for receiving encoded information,
said information including presentation material and operation material, wherein said presentation material is represented in at least two forms, the operation material comprising at least a portion of the software required to play back the presentation material represented in a first form but not required to play back the presentation material represented in another form, processor means for generating in response to said presentation material one or more signals representing sounds and/or visual images, and adaptor means for adapting in response to said operation material the operational characteristics of said receiver means, said processor means, and/or said adaptor means, wherein the operational characteristics of at least one of said receiver means, said processor means, and said adaptor means is controlled by software installed in the apparatus and said adaptor means alters and/or replaces said installed software in response to operation material software so that the apparatus may play back the presentation material represented in said first form.

2. Apparatus according to claim 1 wherein said adaptor means includes control means for establishing in response to said operation material the version or versions of the software required to play back the presentation material, wherein said adaptor means alters and/or replaces only the installed software which is not the required version.

3. Apparatus according to claim 2 wherein said operation material also comprises directory information providing an inventory of the operation material software, whereby said control means establishes the installed software to be altered and/or replaced by comparing the directory information to the installed software.

4. Apparatus according to claim 1 wherein said receiver means receives said encoded information carried by either a storage medium or a transmission medium.

5. Apparatus according to claim 1 wherein said receiver means receives said encoded information from an optical storage medium.

6. Apparatus according to claim 5 wherein said optical storage medium is motion picture film stock carrying an analog soundtrack and encoded digital information, said presentation material comprising said analog soundtrack and a portion of said encoded digital information, and said operation material constituting a portion of said encoded digital information.

7. Apparatus according to claim 1 wherein said receiver means receives said encoded information from a magnetic storage medium.

8. Apparatus according to claim 7 wherein said magnetic storage medium is magnetic tape carrying analog information and encoded digital information, said presentation material comprising said analog information and a portion of said encoded digital information, and said operation material constituting a portion of said encoded digital information.

9. Apparatus according to claim 1 wherein said receiver means receives said encoded information from an electro-magnetic signal.

10. Apparatus according to claim 1 wherein said adaptor means includes memory means for storing installed software.

11. Apparatus according to claim 10 wherein said memory means includes read/write memory means and wherein altered and/or replaced installed software is stored in said read/write memory means.

12. Apparatus according to claim 11 wherein said memory means includes read only memory means, said read only memory means having a base software version stored therein for controlling the operational characteristics of at least one of said receiver means, said processor means, and said adaptor means.

13. Apparatus according to claim 11 wherein altered and/or replaced installed software is stored in said read/write memory means only in association with playback of the presentation material carrying the operation material software resulting in said altered and/or replaced software.

14. Apparatus according to claim 11 wherein altered and/or replaced installed software is stored in said read/write memory means until the subsequent playback of presentation material carrying operation material software causing said altered and/or replaced installed software to be further altered and/or replaced.

15. Apparatus according to claim 11 wherein, in response to one type of operation material software, altered and/or replaced installed software is stored in said read/write memory means only in association with playback of the presentation material carrying the operation material software resulting in said altered and/or replaced installed software, and, in response to another type of operation material software, altered and/or replaced installed software is stored in said read/write memory means until the subsequent playback of presentation material carrying operation material software causing said altered and/or replaced installed software to be further altered and/or replaced.

16. Apparatus according to claim 1 wherein said operation material comprises at least a portion of the software to play back the presentation material using one or more than one playback system implementation, wherein said adaptor means includes control means for establishing, in response to said operation material, the version or versions of the software required to play back the presentation material on the playback system implementation associated with the apparatus.

17. Apparatus according to claim 1 wherein said processor means generates one or more signals representing sounds and/or visual images in response to presentation material represented in said first form.

18. Apparatus according to claim 17 wherein said adaptor means includes means for interrupting the operation of said processor means and for outputting signals representing sounds and/or visual images in response to presentation material represented in another form while said adaptor means is altering and/or replacing installed software in response to operation material software, whereby signals representing sounds and/or visual images are provided by the apparatus substantially without interruption.

19. Apparatus according to claim 18 wherein said adaptor means includes control means for establishing in response to said operation material the version or versions of said software required to play back the presentation material represented in the first form, wherein said adaptor means alters and/or replaces only the installed software which is not the required version.

20. Apparatus according to claim 18 wherein said operation material comprises at least a portion of the software to play back the presentation material represented in the first form using one or more than one playback system implementation, wherein said adaptor means includes control means for establishing, in response to said operation material, the version or versions of the software required to play back the presentation material represented in the first form on the playback system implementation associated with the apparatus.

21. Apparatus according to any one of claims 17-20 wherein presentation material represented in a first form is represented in the form of digital information and presentation material represented in a second form is also represented in the form of digital information.

22. Apparatus according to any one of claims 17-20 wherein presentation material represented in a first form is represented in the form of digital information and presentation material represented in a second form is represented in the form of analog information.

23. Apparatus according to claim 22 wherein said receiver means receives said encoded information carried by either a storage medium or a transmission medium.

24. Apparatus according to claim 22 wherein said receiver means receives said encoded information from an optical storage medium.

25. Apparatus according to claim 24 wherein said optical storage medium is motion picture film stock and wherein said analog information is carried by a conventional analog soundtrack.

26. Apparatus according to claim 22 wherein said receiver means receives said encoded information from a magnetic storage medium.

27. Apparatus according to claim 26 wherein said magnetic storage medium is magnetic tape.

28. Apparatus according to claim 22 wherein said receiver means receives said encoded information from an electro-magnetic signal.

29. Apparatus comprising
receiver means for receiving encoded information, said information including presentation material and operation material, wherein said presentation material is represented in at least two forms, the operation material comprising at least a portion of the software required to play back the presentation material represented in a first form but not required to play back the presentation material represented in another form, or said information including only presentation material requiring base software to play back the presentation material,
processor means for generating in response to said presentation material one or more signals representing sounds and/or visual images, and
adaptor means for adapting in response to said operation material the operational characteristics of said receiver means, said processor means, and/or said adaptor means, wherein the operational characteristics of at least one of said receiver means, said processor means, and said adaptor means is controlled by software installed in the apparatus and said adaptor means alters and/or replaces said installed software in response to operation material software so that the apparatus may play back the presentation material represented in said first form, said software installed in the apparatus including base software for use in playing back presentation material received without operation material or in case of a failure.

30. Apparatus according to claim 29 wherein said adaptor means includes memory means for storing installed software.

31. Apparatus according to claim 30 wherein said memory means includes read/write memory means and wherein altered and/or replaced installed software is stored in said read/write memory means.

32. Apparatus according to claim 31 wherein said memory means includes read only memory means, said read only memory means having said base software stored therein.

33. Apparatus according to any of claims 1, 2, 3 or 29 further comprising a medium carrying said encoded information received by said receiving means.

34. Apparatus according to claim 33 wherein said medium is a storage medium or a transmission medium.

35. Apparatus according to claim 33 wherein said medium is an optical storage medium.

36. Apparatus according to claim 35 wherein said optical storage medium is motion picture film stock.

37. Apparatus according to claim 33 wherein said medium is a magnetic storage medium.

38. Apparatus according to claim 37 wherein said magnetic storage medium is magnetic tape.

39. Apparatus according to claim 33 wherein said medium is a transmission medium for electro-magnetic signals.

40. A method comprising
receiving encoded information, said information including presentation material and operation material, wherein said presentation material is represented in at least two forms, the operation material comprising at least a portion of the software required to play back the presentation material represented in a first form but not required to play back the presentation material represented in another form, or said information including only presentation material requiring base software to play back the presentation material,
generating in response to said presentation material one or more signals representing sounds and/or visual images, and
adapting in response to said operation material the operational characteristics of said receiving, said generating, and/or said adapting, wherein the operational characteristics of at least one of said receiving, said generating, and said adapting is controlled by installed software and said adapting alters and/or replaces said installed software in response to operation material software so that the method may play back the presentation material represented in said first form, said installed software including base software for use in playing back presentation material received without operation material or in case of a failure.

41. A method according to claim 40 wherein said adapting includes storing installed software.

42. A method according to claim 41 wherein said storing includes read/write storing and wherein altered and/or replaced installed software is stored by said read/write storing.

43. A method according to claim 42 wherein said storing includes read only storing, said read only memory storing having said base software stored therein.

44. A software-controlled information playback process comprising
initializing the process, said initializing including the loading from stored memory of software for controlling said software-controlled process,
receiving packets of digitally encoded information, said packets including digitally encoded information representing sound and/or visual images, and software for altering and/or replacing said software from stored memory, and also receiving information in another form representing the same sound and/or visual images, determining if the software from stored memory is suitable for controlling said playback process, generating signals in response to the digitally encoded information representing said sound and/or visual images if the software from stored memory is suitable for controlling the playback process, or, if the software from stored memory is not suitable for controlling the playback process, generating signals in response to said information in another form and altering and/or replacing the software from stored memory in response to said received software, and if the software from stored memory is not suitable for controlling the playback process, re-initializing the process, said re-initializing including the loading of altered and/or replaced software for controlling said software-controlled process.

45. Apparatus comprising receiver means for receiving encoded information, said information including operation material and presentation material, wherein said presentation material is represented in at least two different forms, the operation material comprising at least a portion of the software required to play back the presentation material represented in a first form but not required to play back the presentation material represented in another form, processor means for generating, in response to said presentation material represented in a first form, one or more signals representing sounds and/or visual images, and adaptor means for adapting in response to said operation material the operational characteristics of said receiver means, said processor means, and/or said adaptor means, wherein the operational characteristics of at least one of said receiver means, said processor means, and said adaptor means is controlled by software installed in the apparatus and said adaptor means alters and/or replaces said installed software in response to operation material software so that the apparatus may play back the presentation material, wherein said adaptor means includes means for interrupting the operation of said processor means and for outputting signals representing sounds and/or visual images in response to presentation material represented in another form while said adaptor means is altering and/or replacing installed software in response to operation material software, whereby signals representing sounds and/or visual images are provided by the apparatus substantially without interruption.

46. Apparatus according to claim 45 wherein said receiver means is for receiving encoded information which includes presentation material represented in at least two different forms, the operation material comprising at least a portion of the software required to play back the presentation material represented in a first form but not required to play back the presentation material represented in another form.

47. Apparatus according to claim 46 wherein said processor means generates one or more signals representing sounds and/or visual images in response to presentation material represented in said first form.

48. Apparatus according to claim 47 wherein said adaptor means includes control means for establishing in response to said operation material the version or versions of said software required to play back the presentation material represented in the first form, wherein said adaptor means alters and/or replaces only the installed software which is not the required version.

49. Apparatus according to claim 47 wherein said operation material comprises at least a portion of the software to play back the presentation material represented in the first form using one or more than one playback system implementation, wherein said adaptor means includes control means for establishing, in response to said operation material, the version or versions of the software required to play back the presentation material represented in the first form on the playback system implementation associated with the apparatus.

50. A method comprising receiving encoded information, said information including operation material and presentation material, wherein said presentation material is represented in at least two different forms, the operation material comprising at least a portion of the software required to play back the presentation material represented in a first form but not required to play back the presentation material represented in another form, generating, in response to said presentation material represented in a first form, one or more signals representing sounds and/or visual images, and adapting in response to said operation material the operational characteristics of said receiving, said processing, and/or said adapting, wherein the operational characteristics of at least one of said receiving, said processing, and said adapting is controlled by software installed in the apparatus and said adapting alters and/or replaces said installed software in response to operation material software so that the method may play back the presentation material, wherein said adapting includes interrupting the operation of said processing and outputting signals representing sounds and/or visual images in response to presentation material represented in another form while said adapting is altering and/or replacing installed software in response to operation material software, whereby signals representing sounds and/or visual images are provided by the method substantially without interruption.

51. A method comprising receiving encoded information, said information including presentation material and operation material, wherein said presentation material is represented in at least two forms, the operation material comprising at least a portion of the software required to play back the presentation material represented in a first form but not required to play back the presentation material represented in another form, generating in response to said presentation material one or more signals representing sounds and/or visual images, and adapting in response to said operation material the operational characteristics of said receiving, said generating, and/or said adapting, wherein the operational characteristics of at least one of said receiving, said generating, and said adapting is controlled by installed software and said adapting alters and/or replaces said installed software in response to operation material software so that the method may play back the presentation material represented in said first form.

52. A method according to claim 51 wherein said adapting includes establishing in response to said operation material the version or versions of the software required to play back the presentation material, wherein said adapting alters and/or replaces only the installed software which is not the required version.

53. A method according to claim 52 wherein said operation material also comprises directory information providing an inventory of the operation material software, whereby said establishing establishes the installed software to be altered and/or replaced by comparing the directory information to the installed software.

54. A method according to claim 51, wherein said receiving receives said encoded information carried by either a storage medium or a transmission medium.

55. A method according to claim 51, wherein said receiving receives said encoded information from an optical storage medium.

56. A method according to claim 55 wherein said optical storage medium is motion picture film stock carrying an analog soundtrack and encoded digital information, said presentation material comprising said analog soundtrack and a portion of said encoded digital information, and said operation material constituting a portion of said encoded digital information.

57. A method according to claim 51 wherein said receiving receives said encoded information from a magnetic storage medium.

58. A method according to claim 57 wherein said magnetic storage medium is magnetic tape carrying analog information and encoded digital information, said presentation material comprising said analog information and a portion of said encoded digital information, and said operation material constituting a portion of said encoded digital information.

59. A method according to claim 51 wherein said adapting includes storing installed software.

60. A method according to claim 59 wherein said storing includes read/write storing and wherein altered and/or replaced installed software is stored by said read/write storing.

61. A method according to claim 60 wherein said storing includes read only storing, said read only storing having a base software version stored therein for controlling the operational characteristics of at least one of said receiving, said generating, and said adapting.

62. A method according to claim 60 wherein altered and/or replaced installed software is stored by said read/write storing only in association with playback of the presentation material carrying the operation material software resulting in said altered and/or replaced software.

63. A method according to claim 60 wherein altered and/or replaced installed software is stored by said read/write storing until the subsequent playback of presentation material carrying operation material software causing said altered and/or replaced installed software to be further altered and/or replaced.

64. A method according to claim 60 wherein, in response to one type of operation material software, altered and/or replaced installed software is stored by said read/write storing only in association with playback of the presentation material carrying the operation material software resulting in said altered and/or replaced installed software, and, in response to another type of operation material software, altered and/or replaced installed software is stored by said read/write storing until the subsequent playback of presentation material carrying operation material software causing said altered and/or replaced installed software to be further altered and/or replaced.

65. A method according to claim 16 wherein said operation material comprises at least a portion of the software to play back the presentation material using one or more than one playback system implementation, wherein said adapting includes establishing, in response to said operation material, the version or versions of the software required to play back the presentation material on the playback system implementation associated with the apparatus.

66. A method according to claim 51 whererin said receiver means receives said encoded information from an electro-magnetic signal.

67. A method according to claim 51 wherein said generating generates one or more signals representing sounds and/or visual images in response to presentation material represented in said first form.

68. A method according to claim 67 wherein said adapting interrupts the generating and outputs signals representing sounds and/or visual images in response to presentation material represented in another form while said adapting alters and/or replaces installed software in response to operation material software, whereby signals representing sounds and/or visual images are provided by the method substantially without interruption.

69. A method according to claim 68 wherein said operation material comprises at least a portion of the software to play back the presentation material represented in the first form using one or more than one playback system implementation, wherein said adapting includes establishing, in response to said operation material, the version or versions of the software required to play back the presentation material represented in the first form on the playback system implementation associated with the apparatus, wherein said adapting alters and/or replaces only the installed software which is not the required version.

70. A method according to claim 68 wherein said adapting includes establishing in response to said operation material the version or versions of said software required to play back the presentation material represented in the first form.

71. A method according to any one of claims 67–69 wherein presentation material represented in a first form is represented in the form of digital information and presentation material represented in a second form is also represented in the form of digital information.

72. A method according to any one of claims 67–69 wherein presentation material represented in a first form is represented in the form of digital information and presentation material represented in a second form is represented in the form of analog information.

73. A method according to claim 72 wherein said receiving receives said encoded information carried by either a storage medium or a transmission medium.

74. A method according to claim 72 wherein said receiving receives said encoded information from an optical storage medium.

75. A method according to claim 74 wherein said optical storage medium is motion picture film stock and wherein said analog information is carded by a conventional analog soundtrack.

76. A method according to claim 72 wherein said receiving receives said encoded information from a magnetic storage medium.

77. A method according to claim 76 wherein said magnetic storage medium is magnetic tape.

78. A method according to claim 72 wherein said receiving receives said encoded information from an electro-magnetic signal.

* * * * *

UNITED STATES PATENT AND TRADEMARK OFFICE
CERTIFICATE OF CORRECTION

PATENT NO. : 5,390,256
DATED : 2/14/95
INVENTOR(S) : Douglas Mandell, Martin Richards, Mark Atherton, Paul Goldberg, Mark Davis It is certified that error appears in the above-indentified patent and that said Letters Patent is hereby corrected as shown below:

Column 5, line 23, "carded" should be --carried --.

Column 6, line 39, "carded" should be --carried --.

Column 8, line 1, delete ".";

Column 8, line 47, "carded" should be --carried --.

Column 16, line 67, "carded" should be --carried --.

Signed and Sealed this

Twenty-ninth Day of April, 1997

Attest:

BRUCE LEHMAN

*Attesting Officer*   *Commissioner of Patents and Trademarks*